United States Patent
Li et al.

(10) Patent No.: US 7,762,036 B2
(45) Date of Patent: Jul. 27, 2010

(54) NATURAL WOOD SANDWICHED ENGINEERED FLOORING

(75) Inventors: Michael Li, Dongli District (CN); Yufan Zang, Dongli District (CN)

(73) Assignee: Sunshine Wood Industry (Tianjin) Co., Ltd., Tianjin (CN)

( * ) Notice: Subject to any disclaimer, the term of this patent is extended or adjusted under 35 U.S.C. 154(b) by 433 days.

(21) Appl. No.: 11/468,375

(22) Filed: Aug. 30, 2006

(65) Prior Publication Data

US 2007/0062153 A1    Mar. 22, 2007

(30) Foreign Application Priority Data

Aug. 31, 2005    (CN) .................. 2005 2 0027211

(51) Int. Cl.
*E04B 2/00*    (2006.01)

(52) U.S. Cl. .................. 52/592.1; 52/783.1; 428/50

(58) Field of Classification Search ................ 52/455, 52/456, 457, 458, 592.1, 783.1; 428/50, 428/54, 106, 537.1
See application file for complete search history.

(56) References Cited

U.S. PATENT DOCUMENTS

| | | | | |
|---|---|---|---|---|
| 2,263,930 A | * | 11/1941 | Pasquier | .................. 428/53 |
| 3,888,061 A | * | 6/1975 | Kahr | .................. 52/591.1 |
| 4,388,788 A | * | 6/1983 | Bosco | .................. 52/390 |
| 6,217,976 B1 | * | 4/2001 | MacPherson et al. | .................. 428/106 |
| 6,824,851 B1 | * | 11/2004 | Locher et al. | .................. 428/76 |
| 7,152,379 B2 | * | 12/2006 | Lin et al. | .................. 52/403.1 |
| 2003/0012970 A1 | * | 1/2003 | Auclair et al. | .................. 428/537.1 |

* cited by examiner

*Primary Examiner*—David Dunn
*Assistant Examiner*—Daniel Kenny
(74) *Attorney, Agent, or Firm*—Paul & Paul

(57) ABSTRACT

Natural wood sandwiched engineered flooring utilizes all natural wood as the raw material which is made into several components which are combined to make this product. The components are a single or multilayer top veneer bottom or base layer and a middle layer. The four sides of the natural wood sandwiched engineered flooring strip consist of either a tongue and a groove or an interlocking system. The middle layer consists of two parallel solid wood strips, and located perpendicular to and between the parallel solid wood strips are small pieces of soft wood, which are glued together. The small soft wood pieces can be of fast growing soft wood, and as such saves treasured hardwood lumber. The production cost of the raw material is much lower than other types of engineered flooring. Further, an enhanced stabilization of the hardwood flooring is provided which is more suitable for radiant heat.

20 Claims, 1 Drawing Sheet

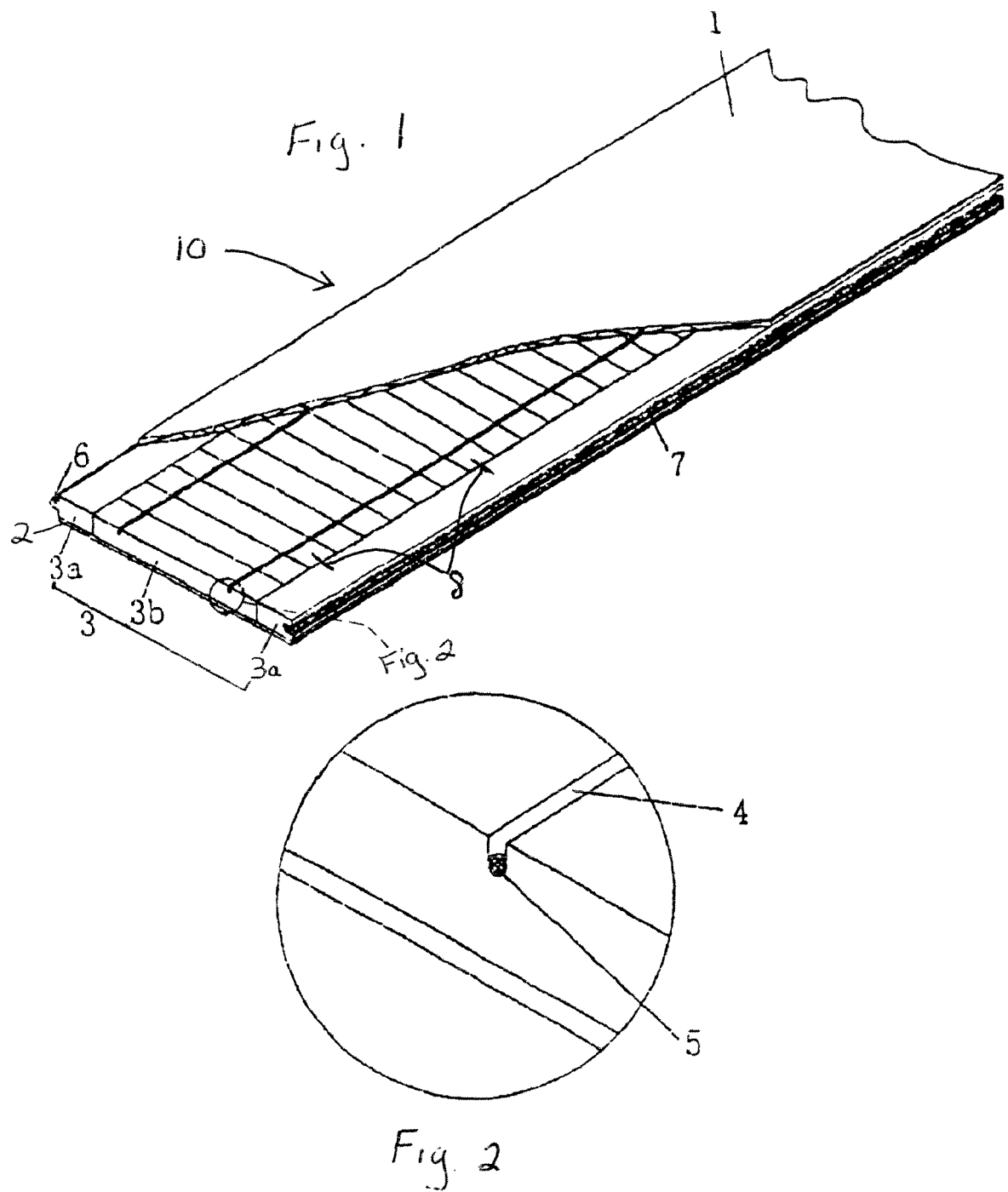

NATURAL WOOD SANDWICHED ENGINEERED FLOORING

CROSS-REFERENCE TO RELATED APPLICATIONS

This application claims priority under 35 U.S.C. 119 to People's Republic of China patent application number 200520027211.0 filed on Aug. 31, 2005.

BACKGROUND OF THE INVENTION

This invention is designed using all natural wood. The natural wood is made into parts and the parts are assembled together to produce the wood flooring strips. This process of combining the parts together significantly improves the stability of the flooring made with the strips.

Along with the modernization of the building materials, the material to produce hardwood flooring has drastically changed as well. For example, in the marketplace there are various selections of flooring, such as laminate flooring and engineered flooring. However, most end users want to have durable, high density, natural and stable hardwood flooring.

Lumber is utilized to manufacture solid wood flooring. According to its appearance and structure, various types of solid wood flooring can be manufactured, such as non tongue and groove flooring, tongue and groove flooring, parquet flooring, and medallion flooring.

Within engineered hardwood flooring, it is very common to have three layers, consisting of the back layer, the top veneer layer, and the middle layer. The middle layer can be made by soft wood, middle density fiber board, or man-made fiber board. Another common type of engineered hardwood flooring has a middle layer which consists of multi-layered plywood.

With the use of solid wood, the end user is not only concerned with the density of the hardwood, but more importantly, they are concerned with the overall stability of the hardwood flooring.

Chinese patent document number 2179889 announced a type of patent to take apart and reassemble engineered hardwood flooring. This patent consists of base, thin wood veneer, surface covered with premium coating, and the back and four sides covered with wax in order to protect the wood from humidity, moisture and to preserve it. Each piece is equipped with tongue and groove on all four sides and is affixed to the underlying floor studs, with no gaps between the floor pieces.

Chinese patent document number 2320715 announced a type of patent for easy assembling of hardwood flooring. This patent consists of tongue and groove wood strips or tongue and groove wood squares and screws together. On the surface of the strips or squares, horizontally equidistant apart are screws which are used to join the strips or squares together.

Chinese patent document number 2186775 announced a type of patent for matching combination wood flooring strips. This patent consists of many pieces of the same width, same thickness short boards which are linked together. The short side has the linking tongue and groove and there is a part to join the pieces together, or the short side pieces can be linked together with tongue and groove to form a longer piece. The benefit of this type of this type of technology is that it can utilize many smaller, shorter pieces which otherwise would be regarded as wastage.

Chinese patent document number 1228550 announced a patent for interlocking combination flooring. This patent consists of hardwood flooring strips and squares, base and fixed purpose screws. Each wooden strip or square has a fixed base and below the base there is one layer of noise barrier. Horizontal to the strips or squares near the wall there are elastic metal bands, and the base of each piece contains a hole or tongue and groove so that the pieces can be linked together.

SUMMARY OF THE INVENTION

This invention was created to resolve the reactivity and instability of wood flooring with respect to moisture, humidity, heat and other environmental conditions. This invention provides for stabilization of the solid wood sandwiched engineered flooring.

This invention is produced according to the technical specifications set forth below.

Solid wood sandwiched engineered flooring consists of a single layer or multiple layers of a top veneer backboard and a middle layer. There is either a tongue or a groove on each of the four sides of each strip. The middle layer consists of two parallel solid wood strips, and located perpendicular to and between the solid strips are small pieces of soft wood, which are glued together.

This type of new invention uses small pieces of fast growing soft wood, and as such saves treasured hardwood lumber. The production cost of the raw material is much lower than solid and other types of engineered flooring. Further, of equal importance, this invention provides for the enhanced stabilization of the hardwood flooring. In addition, this invention improves the comfort of the walking surfaces due to the increased elasticity. This type of invention is more suitable for radiant heat.

BRIEF DESCRIPTION OF THE DRAWINGS

The features, advantages and operation of the present invention will become readily apparent and further understood from a reading of the following detailed description of the invention with the accompanying drawings, in which like numerals refer to like elements, in which:

FIG. 1 is a perspective view of a section of a natural wood sandwiched engineered flooring strip according to the present invention showing a cross-section thereof and showing the top layer partially removed; and FIG. 2 is an enlarged view of a portion of FIG. 1.

DETAILED DESCRIPTION OF THE INVENTION

Natural wood sandwiched engineered flooring according to the present invention consists of strips 10 having a top layer 1 which has a single layer or multiple layers. As seen in FIG. 1, the top layer 1 can be a surface veneer and the strip 10 further has a back layer or a base layer 2 and a middle layer 3. A strip 10 can have each of the four sides of the strip 10 consist of either a tongue 6 or a groove 7. The present invention features a middle layer 3, which consists of two generally parallel solid wood strips 3a, and located generally perpendicular to and between the parallel solid wood strips 3a are small soft wood pieces 3b which are made of a material such as soft wood, which are joined together by a joining means such as by being glued together.

As seen in FIG. 2, the above-mentioned natural wood sandwiched engineered flooring strips 10 also contain at least two soft wood piece grooves 4 which run generally perpendicular to the small soft wood pieces 3b, here, generally perpendicular to the major axis of the small soft wood pieces 3b.

In the above-mentioned natural wood sandwiched engineered flooring strips 10 small soft wood pieces 3b are linked together by a linking means such as a thin paper thread or nylon thread or metal wire 5 in the soft wood piece grooves 4 which run perpendicular to the small soft wood pieces 3b.

In the above-mentioned natural wood sandwiched engineered flooring strips 10 a top layer 1 which can be veneer is normally thicker than the bottom layer or base layer 2. However, in accordance with the technical specification, the thickness of the top layer 1 can be equal to or less than the thickness of the bottom layer or base layer 2. Also, when the top layer 1 is a veneer layer of the single ply or multi-ply type then generally a premium, high quality grade of raw material is utilized, which thereby results in a more durable and beautiful hardwood floor.

The above-mentioned natural wood sandwiched engineered flooring strips 10 can consist of either a tongue 6 or a groove 7 on all four sides of the natural wood sandwiched engineered flooring strip 10.

When manufacturing the natural wood sandwiched engineered flooring strip 10 according to the present invention, the sequence is as set forth below. The small soft wood pieces 3b are cut to the same size. The small soft wood pieces 3b are then aligned adjacent to each other and grooves 4 are made in each small soft wood piece 3b. The depth of each of the grooves 4 is about one-third to about one-half of the overall thickness of the middle layer 3. A linking means or means for linking the small soft wood pieces 3b to each other, here, a linking member 5 such as thin paper or nylon thread or metal wire is then placed into the grooves 4. The parallel solid wood strips 3a can form an outside border on opposed sides of the natural wood sandwiched engineered flooring strips 10.

The parallel solid wood strips 3a are then fastened to the small soft wood pieces 3b by a fastening means which as shown in FIG. 1 is a staple 8 which is stapled to the small soft wood pieces 3b and a parallel solid wood strip 3a. The base layer 2, middle layer 3 and top layer 1 are joined together by a joining means. The joining means is a means for joining the base layer 2, middle layer 3 and top layer 1. Here, the joining means is an adhesive glue. The base layer 2, middle layer 3 and top layer 1 together with the joining means are then placed in a hot press.

It should be noted that with the engineered hardwood floor of the present invention, the grooves 4 contained in the middle layer 3 can be made at the top or the bottom of the middle layer 3.

Both sides of the two parallel solid wood strips 3a can be either tongue and groove, or an interlocking type system, or a clicking type system.

When manufacturing this new engineered hardwood floor strips 10, the wood grain direction of the top layer 1 and bottom or base layer 2 always runs in the same direction, and the wood grain direction of the middle layer 3 always runs opposite and generally perpendicular to that of the top layer 1 and bottom or base layer 2. With the wood grain directions of the layers organized in this manner, an engineered hardwood floor formed from the strips 10 has much enhanced stabilization and product appearance.

According to a customer's requirements, this new engineered sandwiched hardwood floor strips 10 can be manufactured in various lengths and widths. The thickness of the middle layer 3 ranges from about 5 millimeters to about 30 millimeters, and generally is about 10 millimeters in most products. The width of the top layer 1 when the top layer 1 is veneer ranges from about 50 millimeters to about 300 millimeters. The combined width of the two parallel solid wood strips 3a which can form a border generally is one-third to one-half the width of the top layer 1 which can be veneer. The method for joining the parallel solid wood strips 3a, which can form a border, to the small soft wood pieces 3b can either be via stapling, glue, tongue and groove or interlocking system.

This inventive engineered sandwiched hardwood floor strip design is more suitable for radiant heat.

Many changes can be made in the above-described invention without departing from the intent and scope thereof. It is therefore intended that the above description be read in the illustrative sense and not in the limiting sense. Substitutions and changes can be made without departing from the scope and intent of the invention.

We claim:

1. A natural wood sandwiched engineered flooring strip having a first end and a second end comprising:
   a base layer of wood;
   a middle layer of wood on said base layer, said middle layer having a first solid wood strip and a second solid wood strip extending along said flooring strip, said first solid wood strip and said second solid wood strip being generally parallel to each other, said middle layer having small soft wood pieces extending between said solid wood strips from said first end to said second end, said soft wood pieces extending generally parallel to each other, said small soft wood pieces extending substantially perpendicular to said first solid wood strip and said second solid wood strip;
   a means for linking each of said small soft wood pieces to each other of said small wood pieces;
   a top layer of wood on said middle layer; and
   a means for joining together said base layer, said middle layer and said top layer.

2. The natural wood sandwiched engineered flooring strip according to claim 1 wherein each of said soft wood pieces has a first groove and a second groove which are arranged such that each of said first groove and second grooves aligns with a respective first groove and second groove on an adjacent soft wood piece and said means for linking said soft wood pieces together comprises a first member in said first groove selected from the group consisting of paper thread, nylon thread and metal wire and a second member in said second groove selected from the group consisting of paper thread, nylon thread and metal wire.

3. The natural wood sandwiched engineered flooring strip according to claim 1 wherein said first solid wood strip has a first flooring strip tongue which projects outwardly from said flooring strip extending along said flooring strip and said second solid wood strip has a first flooring strip groove extending along said flooring strip.

4. The natural wood sandwiched engineered flooring strip according to claim 1 further comprising a means for fastening one of said solid wood strips to one of said soft wood pieces.

5. The natural wood sandwiched engineered flooring strip according to claim 4 wherein said fastening means is a staple which extends from one of said solid wood strips to one of said soft wood pieces.

6. The natural wood sandwiched engineered flooring strip according to claim 4 wherein said fastening means is glue which joins one of said solid wood strips to one of said soft wood pieces.

7. The natural wood sandwiched engineered flooring strip according to claim 4 wherein said fastening means is a tongue and groove system.

8. The natural wood sandwiched engineered flooring strip according to claim 1 wherein said joining means is glue.

9. The natural wood sandwiched engineered flooring strip according to claim 2 wherein the depth of each of said first groove and said second groove is about one-third to one-half of the overall thickness of said middle layer.

10. The natural wood sandwiched engineered flooring strip according to claim 2 wherein said middle layer has a first surface facing said top layer and a second surface facing said base layer and said first groove and said second groove are on said first surface.

11. The natural wood sandwiched engineered flooring strip according to claim 2 wherein said middle layer has a first surface facing said top layer and a second surface facing said base layer and said first groove and said second groove are on said second surface.

12. The natural wood sandwiched engineered flooring strip according to claim 1 wherein said top layer comprises a veneer layer.

13. The natural wood sandwiched engineered flooring strip according to claim 12 wherein said veneer layer is a multi-ply veneer layer.

14. The natural wood sandwiched engineered flooring strip according to claim 1 wherein said base layer and said top layer have a first wood grain direction and said middle layer has a second wood grain direction, said second wood grain direction being perpendicular to said first wood grain direction.

15. The natural wood sandwiched engineered flooring strip according to claim 1 wherein the width of said top layer is between about 50 millimeters to about 300 millimeters.

16. The natural wood sandwiched engineered flooring strip according to claim 1 wherein each of said first solid wood strip and said second solid wood strip has a width as measured in a direction perpendicular to a direction along which said first solid wood strip and said second solid wood strip extend along said flooring strip, and the total width of said first solid wood strip and said second solid wood strip when added together is between about one-third to one-half of the width of said top layer.

17. The natural wood sandwiched engineered flooring strip according to claim 5 wherein said middle layer has a thickness between about 5 millimeters to about 30 millimeters.

18. The natural wood sandwiched engineered flooring strip according to claim 2 wherein said first groove and said second groove are generally perpendicular to the major axis of each of said soft wood pieces.

19. The natural wood sandwiched engineered flooring strip according to claim 1 wherein each of said base layer, said middle layer and said top layer consist essentially of natural wood.

20. The natural wood sandwiched engineered flooring strip according to claim 3 wherein said first flooring strip tongue of said first solid wood strip extends along a first side of said flooring strip and said first flooring strip groove extends along an opposed second side of said flooring strip and wherein said flooring strip has a third side and an opposed fourth side, each of said third side and said fourth sides extending between said first side and said second side, and said flooring strip having a second flooring strip tongue which projects outwardly from said flooring strip which extends along said third side of said flooring strip and a second flooring strip groove which extends along said fourth side of said flooring strip.

* * * * *

UNITED STATES PATENT AND TRADEMARK OFFICE
CERTIFICATE OF CORRECTION

| | |
|---|---|
| PATENT NO. | : 7,762,036 B2 |
| APPLICATION NO. | : 11/468375 |
| DATED | : July 27, 2010 |
| INVENTOR(S) | : Michael Li and Yufan Zang |

It is certified that error appears in the above-identified patent and that said Letters Patent is hereby corrected as shown below:

Col. 2, line 16: delete "single layer or multiple layers of a top veneer backboard and"

insert --single layer or multiple layers of a top veneer, backboard and--

Signed and Sealed this

Ninth Day of November, 2010

David J. Kappos
*Director of the United States Patent and Trademark Office*